United States Patent
Nakaya et al.

(10) Patent No.: US 11,780,146 B2
(45) Date of Patent: Oct. 10, 2023

(54) FUEL TANK MANUFACTURING APPARATUS

(71) Applicant: YACHIYO INDUSTRY CO., LTD., Saitama (JP)

(72) Inventors: Kazunari Nakaya, Tochigi (JP); Masaki Aono, Tochigi (JP); Kunihiko Kondo, Saitama (JP); Kazuhiro Otaki, Saitama (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 17/924,702

(22) PCT Filed: Apr. 7, 2021

(86) PCT No.: PCT/JP2021/014751
§ 371 (c)(1),
(2) Date: Nov. 11, 2022

(87) PCT Pub. No.: WO2021/229959
PCT Pub. Date: Nov. 18, 2021

(65) Prior Publication Data
US 2023/0133505 A1 May 4, 2023

(30) Foreign Application Priority Data
May 13, 2020 (JP) ................. 2020-084761

(51) Int. Cl.
*B29C 49/20* (2006.01)
*B29C 49/48* (2006.01)
*B29L 31/00* (2006.01)

(52) U.S. Cl.
CPC .............. *B29C 49/20* (2013.01); *B29C 49/48* (2013.01); *B29C 2049/2013* (2013.01); *B29L 2031/7172* (2013.01)

(58) Field of Classification Search
CPC ............ B29C 2049/2013; B29C 49/20; B29C 49/4802; B29L 2031/7172
See application file for complete search history.

(56) References Cited

U.S. PATENT DOCUMENTS

2016/0158992 A1* 6/2016 Criel ...................... B29C 49/20
264/516

FOREIGN PATENT DOCUMENTS

| JP | H03-151223 A | 6/1991 |
| JP | 2002-178394 A | 6/2002 |

(Continued)

OTHER PUBLICATIONS

Mechanical translation of WO 2018/225413 A1 dated Dec. 2018. (Year: 2018).*

(Continued)

*Primary Examiner* — Robert B Davis
(74) *Attorney, Agent, or Firm* — Kenealy Vaidya LLP

(57) ABSTRACT

A fuel tank manufacturing apparatus for a fuel tank, the fuel tank having therein a built-in component with a head portion, a neck portion, and a shoulder portion, and having the built-in component anchored to a tank body with a part of a parison wrapped around the neck portion during molding the tank body, includes: a pair of molding dies to have the parison transferred to the built-in component by blow molding; and shaping devices respectively provided in the pair of molding dies, wherein the shaping devices each include: an end surface to contact the parison; a recess provided in the end surface to receive the head portion and the neck portion and covered by the shoulder portion during molding; and an air hole provided in an area of a bottom surface of the recess corresponding to the head portion through which air pressure is applied toward the head portion.

2 Claims, 9 Drawing Sheets

(56) References Cited

FOREIGN PATENT DOCUMENTS

| WO | 2018/225413 A1 | 12/2018 |
| WO | 2021/229959 A1 | 11/2021 |

OTHER PUBLICATIONS

International Search Report and Written Opinion of the International Search Report for PCT/JP2021/014751 dated Jun. 29, 2021.
Written Opinion of the International Search Report for PCT/JP2021/014751 dated Jun. 29, 2021.

* cited by examiner

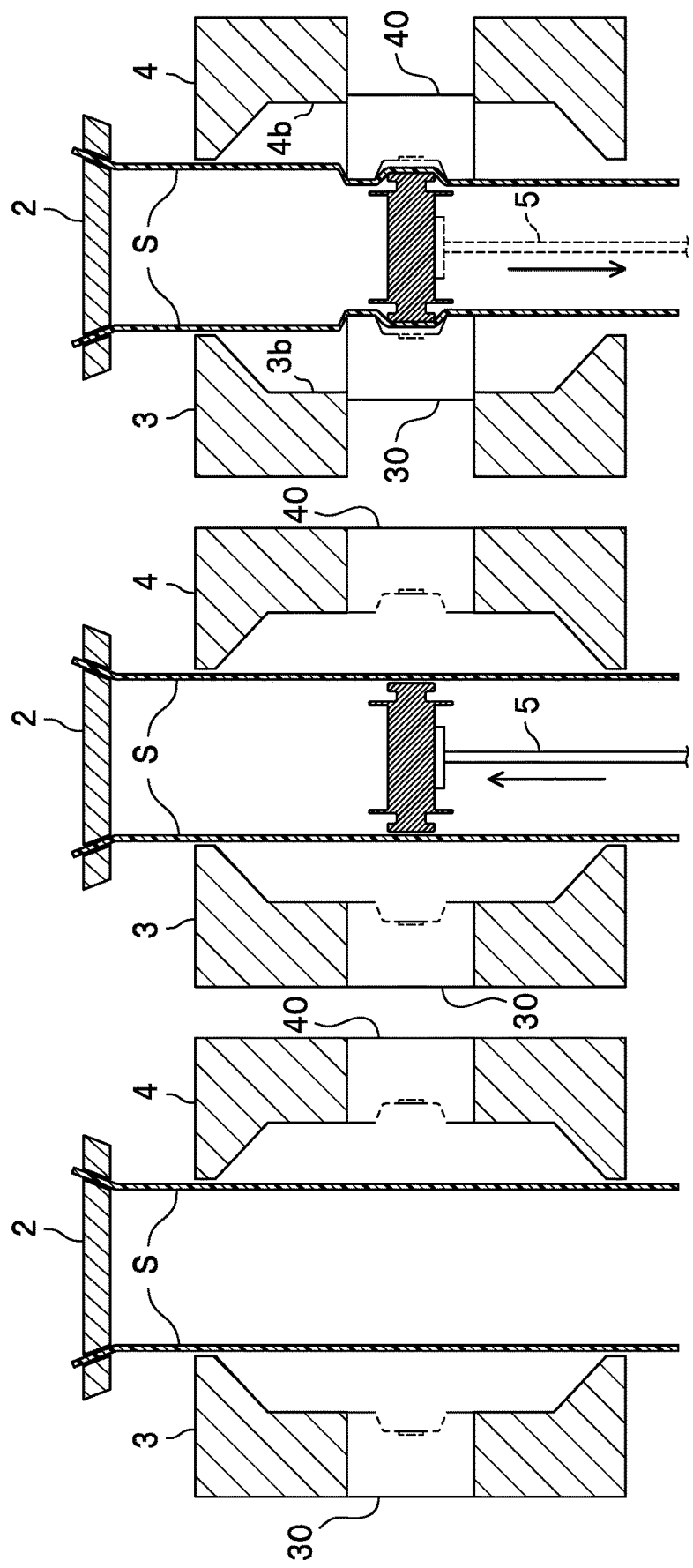

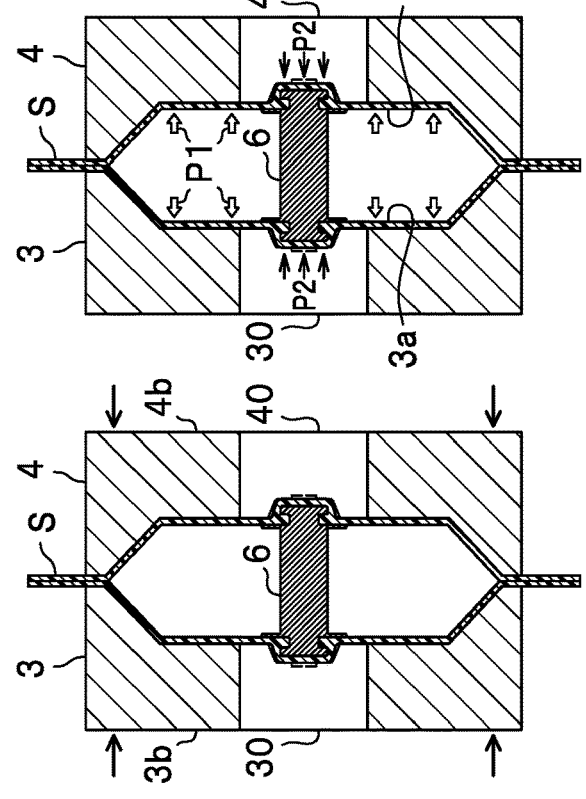

FUEL TANK MANUFACTURING APPARATUS

CROSS-REFERENCE TO RELATED APPLICATION

This application is a U.S. National Stage Application under 35 U.S.C. § 371 of International Patent Application No. PCT/JP2021/014751 filed on 7 Apr. 2021, which claims the benefit of priority to Japanese Patent Application No. 2020-084761 filed on 13 May 2020, the disclosures of all of which are hereby incorporated by reference in their entireties.

TECHNICAL FIELD

The present invention relates to a fuel tank manufacturing apparatus.

BACKGROUND ART

A method has been known for attaching a component, such as a valve, to a blow-molded product, such as a fuel tank of an automobile, as a built-in component. For example, Patent Document 1 describes a manufacturing method of a fuel tank containing a built-in component with a head portion, a neck portion, and a shoulder portion. This manufacturing method of a fuel tank blows air from outside a parison, during molding a tank body, to shape the parison along the neck portion so that the built-in component is anchored to the tank body.

SUMMARY OF THE INVENTION

Problems to be Solved

A parison is less likely to enter a narrow space around a neck portion with a conventional technique, to have difficulty in shaping a parison along the neck portion. The invention of Patent Document 1 applies air pressure toward the neck portion from outside the head portion, to cause the parison to enter the space around the neck portion. However, this approach causes a part of the parison around the head and neck portions to become thin locally and a part of the parison located on the head portion less likely contributes to the shaping, to have problems such as variation in thickness of the parison and breakage of a barrier layer.

The present invention has been devised from such a viewpoint, and is intended to prevent variation in thickness of a parison when shaping the parison onto a built-in component.

Solution to Problems

In order to solve the above-identified problems, the present invention provides a fuel tank manufacturing apparatus for a fuel tank, the fuel tank having therein a built-in component with a head portion, a neck portion, and a shoulder portion, and having the built-in component anchored to a tank body with a part of a parison wrapped around the neck portion during molding the tank body, the apparatus including: a pair of molding dies to have the parison transferred to the built-in component by blow molding; and shaping devices respectively provided in the pair of molding dies, wherein the shaping devices each include: a recess to receive the head portion and the neck portion and covered by the shoulder portion during molding; and an air hole provided in an area of a bottom surface of the recess, corresponding to the head portion, through which air pressure is applied toward the head portion.

According to the present invention, having the air hole at a position in the bottom surface of the recess, corresponding to the head portion, allows for applying air pressure to the head portion, to place a part of the parison onto an outer circumferential surface of the head portion as well as the neck portion, while keeping a part of the parison located between the molding die and the head portion having a predetermined thickness, so that variation in thickness of the parison and breakage of a barrier layer are prevented.

In addition, the air hole is composed of two or more openings in a slit shape.

According to the present invention, the parison is prevented from partly entering the air hole during molding and thus being partly shaped into a swell.

Advantageous Effects of the Invention

The fuel tank manufacturing apparatus of the present invention prevents variation in thickness of a parison, when shaping the parison onto a built-in component.

BRIEF DESCRIPTION OF DRAWINGS

FIG. 8A is a diagram to illustrate a step of injecting the parison in a method of manufacturing a fuel tank with the fuel tank manufacturing apparatus;

FIG. 8B is a diagram to illustrate a step of putting in the built-in component in the method of manufacturing a fuel tank with the fuel tank manufacturing apparatus;

FIG. 8C is a diagram to illustrate a step of provisionally setting the built-in component in the method of manufacturing a fuel tank with the fuel tank manufacturing apparatus;

FIG. 9A is a diagram to illustrate a step of closing a molding die in the method of manufacturing a fuel tank with the fuel tank manufacturing apparatus;

FIG. 9B is a diagram to illustrate a step of blow molding in the method of manufacturing a fuel tank with the fuel tank manufacturing apparatus;

FIG. 9C is a diagram to illustrate a step of cooling the parison in the method of manufacturing a fuel tank with the fuel tank manufacturing apparatus; and FIG. 9D is a diagram to illustrate a step of opening the molding die in the method of manufacturing a fuel tank with the fuel tank manufacturing apparatus;

DETAILED DESCRIPTION OF EMBODIMENTS

<<Fuel Tank of Embodiment>>

Figure 1:
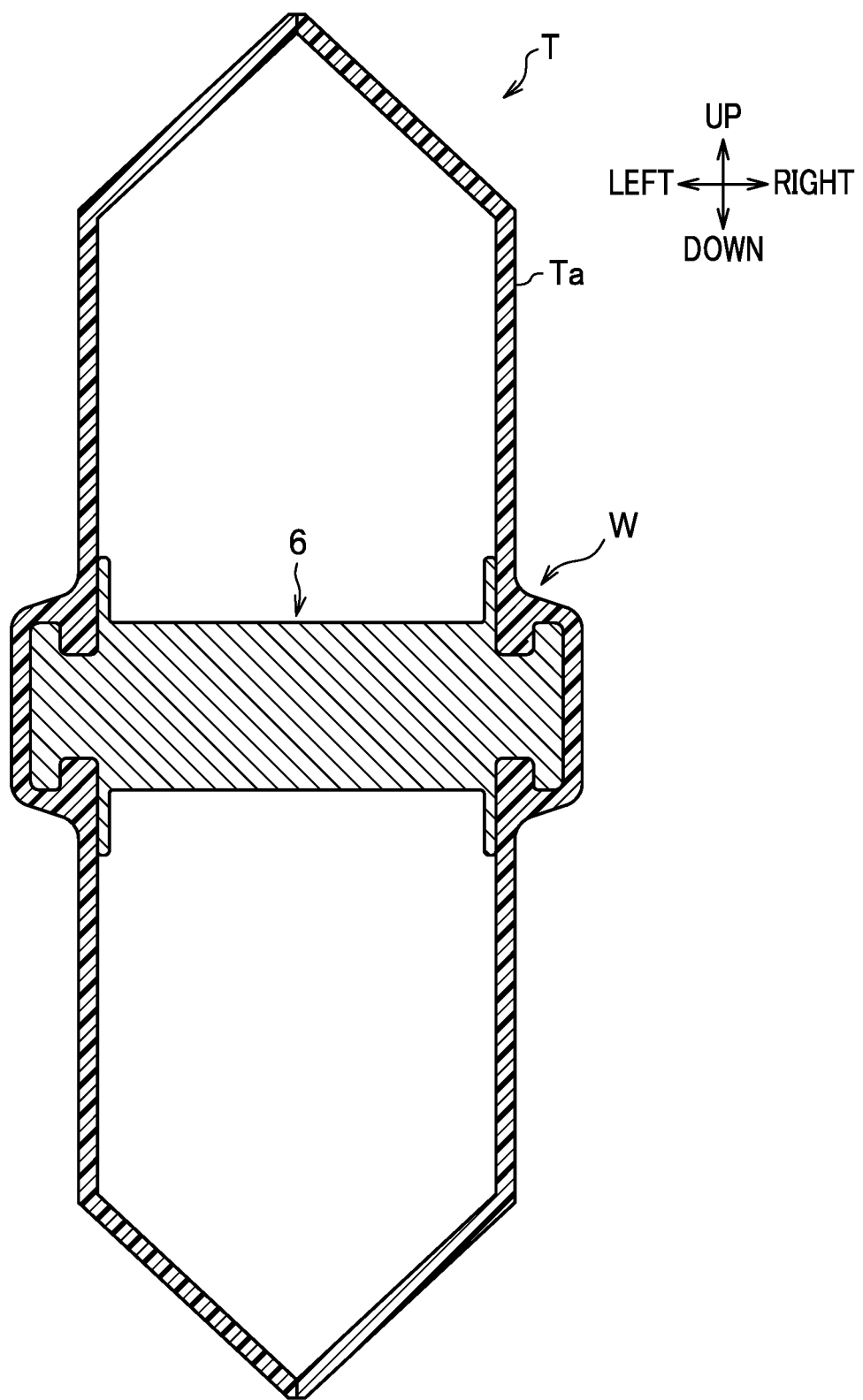
FIG. 1 is a schematic cross-sectional view of a fuel tank according to an embodiment of the present invention.

A fuel tank T shown in FIG. 1 is a fuel tank to be mounted on a transportation means such as an automobile, a motorcycle, and a ship, and mainly includes a tank body Ta and a built-in component 6. As shown in FIG. 1, the present embodiment exemplarily provides a columnar reinforcing member for maintaining strength of the fuel tank T, as the built-in component 6, but the built-in component 6 may be a valve, a wave-eliminating plate, or the like. In the following description, "up and down" directions and "right and left" directions follow those indicated by arrows in FIG. 1. These directions are defined for the purpose of illustration and do not limit the present invention. Note that the right and left directions in FIG. 1 correspond to opening and closing directions of a pair of molding dies for manufacturing the fuel tank T.

The tank body Ta is a hollow container made of resin to store fuel such as gasoline, and has a multi-layer structure including a barrier layer, for example. The tank body Ta is made of mainly a thermoplastic resin such as polyethylene and high-density polyethylene. The tank body Ta is formed by blow molding, for example.

<Fuel Tank Manufacturing Apparatus 1>

Figure 2:
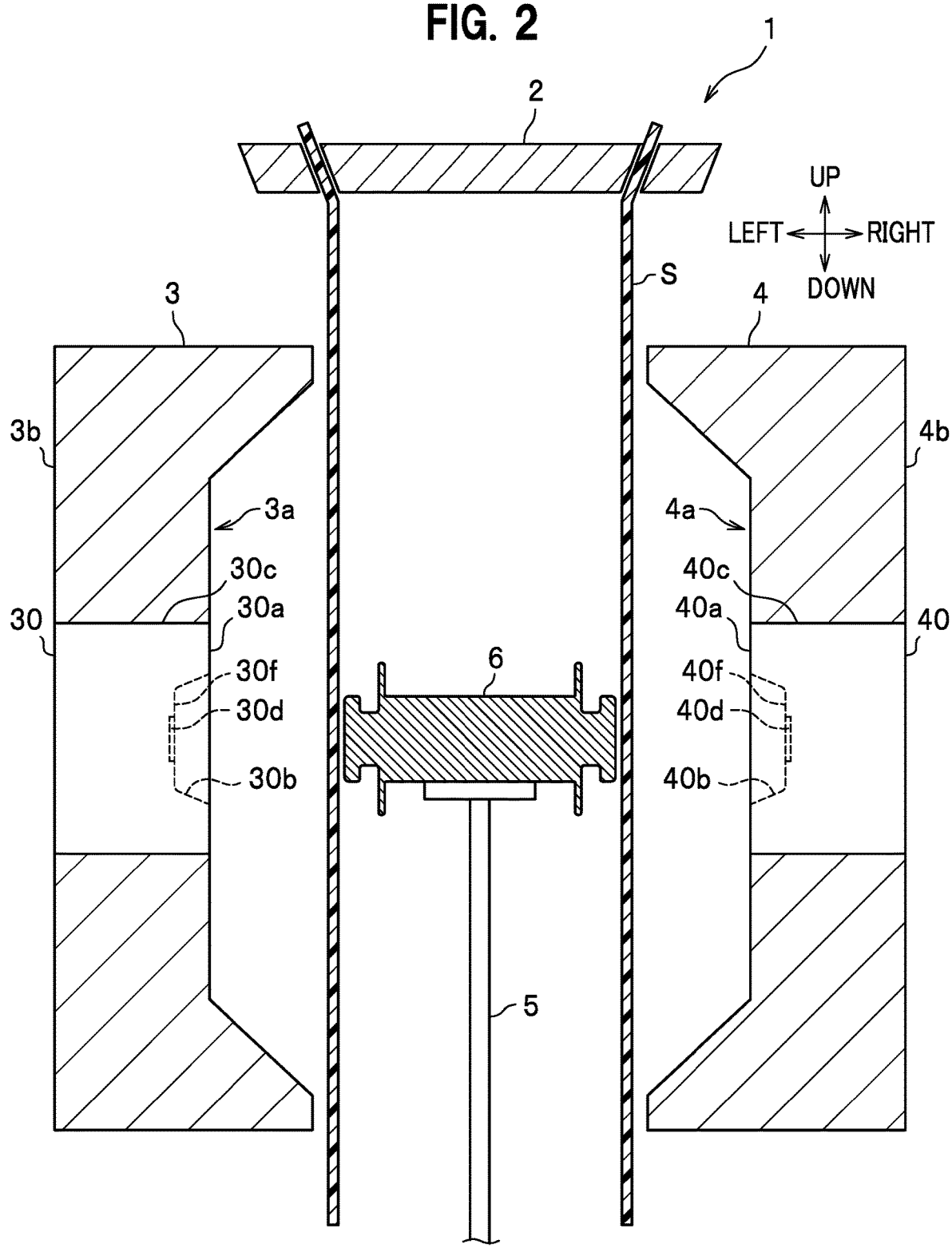
FIG. 2 is a schematic vertical cross-sectional view of a fuel tank manufacturing apparatus.

Next, a description is given of a fuel tank manufacturing apparatus. The fuel tank manufacturing apparatus 1 shown in FIG. 2 is an apparatus to blow mold a parison S in a cylindrical shape to manufacture the fuel tank T (see FIG. 1) having the built-in component 6 therein. Note that the fuel tank T may be manufactured by molding a parison in a sheet shape (not shown).

As shown in FIG. 2, the fuel tank manufacturing apparatus 1 mainly includes a die 2, a first molding die 3 and a second molding die 4 in a pair, shaping devices 30 and 40, and an elevator 5 to be moved up and down between the first molding die 3 and second molding die 4.

The die 2 is arranged above the first molding die 3 and second molding die 4, and is a supply means to supply the parison S to the first molding die 3 and second molding die 4. The parison S has a multi-layered structure in cross section made of HDPE (high density polyethylene), EVOH (ethylene-vinyl alcohol copolymer), an adhesive layer, and the like, and is a precursor to the tank body Ta of the fuel tank T (see FIG. 1).

The first molding die 3 and second molding die 4 are molding means for clamp-molding the fuel tank T (see FIG. 1). The first molding die 3 and second molding die 4 are arranged to face each other, and are formed, in the facing surfaces thereof, with molding portions 3a and 4a in a concave shape. The first molding die 3 and second molding die 4 can be moved in the right and left directions so as to be opened and closed, and the parison S is supplied in a state that the first molding die 3 and second molding die 4 are opened. In addition, the first molding die 3 and second molding die 4 are provided with blow pins (not shown) for blowing air into the first molding die 3 and second molding die 4, so that the air pressure (blow pressure) in the first molding die 3 and second molding die 4 is suitably adjusted by a first positive pressure applying means (not shown). The parison S is transferred to the molding portions 3a and 4a by the first positive pressure applying means.

The first molding die 3 is configured to be separable, and includes a main body portion 3b and the shaping device 30 that can be separated from the main body portion 3b. Similarly, the second molding die 4 is configured to be separable, and includes a main body portion 4b and the shaping device 40 that can be separated from the main body portion 4b.

<Shaping Devices 30, 40>

Figure 3:
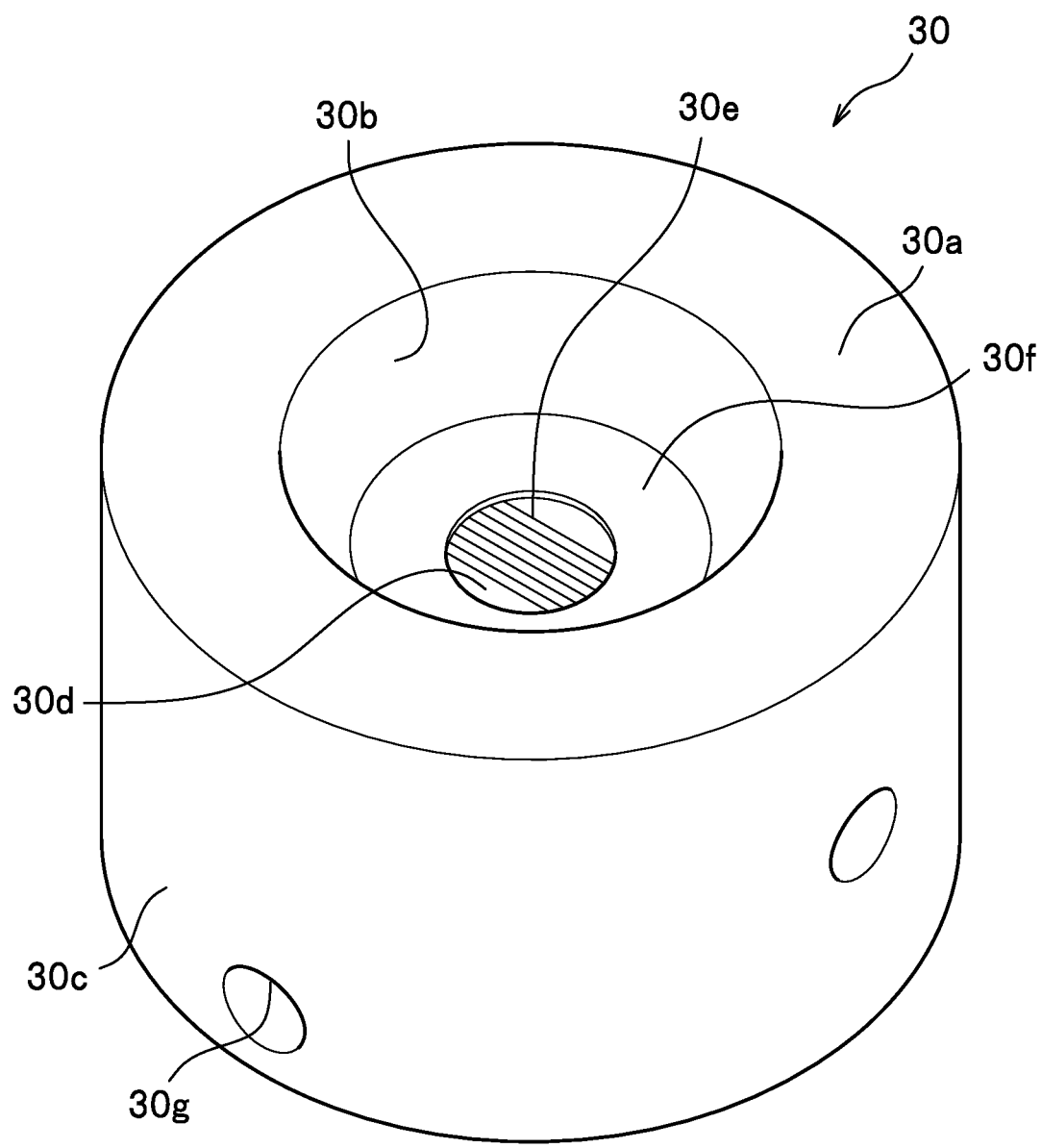
FIG. 3 is a perspective view of a shaping device.

A structure of the shaping device 30 is described with reference to FIGS. 3 and 4. Note that the shaping device 30 is described here, but the shaping device 40 has the same structure and advantageous effects as those of the shaping device 30, and thus the description hereinbelow is focused on the shaping device 30. The shaping device 30 is formed with a recess 30b in an end surface 30a and has a cylindrical shape, as shown in FIG. 3.

The shaping device 30 is formed with the recess 30b corresponding to a shape of either end in a length direction of the built-in component 6, and the recess 30b receives the end of the built-in component 6 during molding. The recess 30b here has a hollow in a circular cone shape. In addition, an air hole 30d is provided in a bottom surface 30f of the recess 30b for blowing air into the recess 30b. The air pressure (blow pressure) in the recess 30b is suitably adjusted by a second positive pressure applying means (not shown). Additionally, the shaping device 30 is formed, in a side surface 30c thereof, with an air supply hole 30g. The air supply hole 30g communicates with the air hole 30d and air is supplied therethrough by the second positive pressure applying means.

Figure 4:
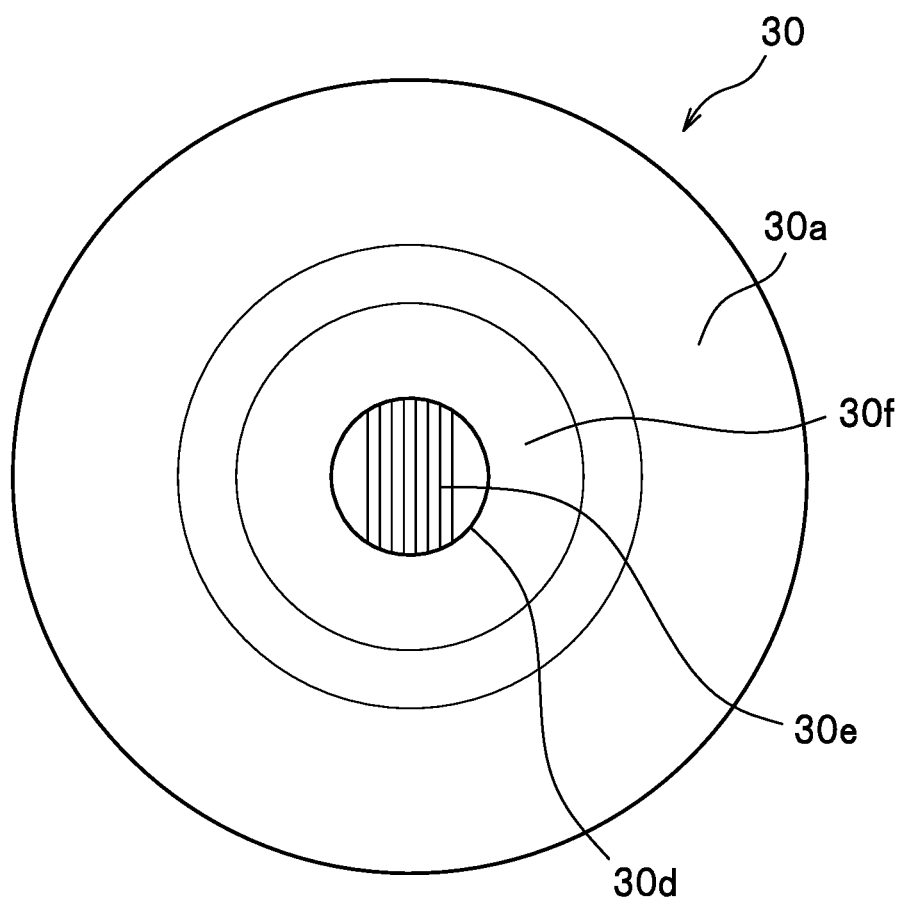
FIG. 4 is a top view of the shaping device.

The air hole 30d is formed in the bottom surface 30f of the recess 30b, as shown in FIG. 4. The air hole 30d is formed in an area corresponding to the head portion 6d of the built-in component 6. This allows for applying air pressure (blow pressure) to the head portion 6d via the parison S, when the head portion 6d has been received in the recess 30b during molding. Note that the "area corresponding to the head portion 6d" is an area radially inside the head portion 6d.

In addition, the air hole 30d in the present embodiment has two or more openings 30e in a slit shape, even though a shape thereof is not limited thereto. Here, control is made during blow molding on blow pressure applied to the tank body Ta and blow pressure applied to the shaping device 30, but there is a risk of the parison S partly entering the air hole 30d to have the parison S partly shaped into a swell, depending on the control. However, the present embodiment includes the openings 30e in a slit shape and is thus capable of preventing such a problem. Note that the sizes (widths) of the openings 30e in a slit shape may be suitably set to the extent that the parison S does not partly enter the openings 30e.

<Elevator 5>

The elevator 5 is a moving means to move the built-in component 6 to a mounting position. The mounting position here is inside the parison S in a cylindrical shape and between the shaping devices 30 and 40.

Next, a description is given of operation of the fuel tank manufacturing apparatus 1. Before describing the entire process of the method of manufacturing the fuel tank T (see FIG. 1) with the fuel tank manufacturing apparatus 1, a description is given of transferring the parison to, and around the ends of, the built-in component 6.

<Built-In Component 6>

The built-in component 6 may be made of either a material that can be welded to the parison S (see FIG. 2) as a precursor to the tank body Ta (a thermoplastic resin such as PE (polyethylene), for example), or a material that cannot be welded to the parison S (such as POM and metal, for example). The parison S has a multi-layered structure in cross section made of HDPE (high density polyethylene), EVOH (ethylene-vinyl alcohol copolymer), an adhesive layer and the like.

Figure 5:
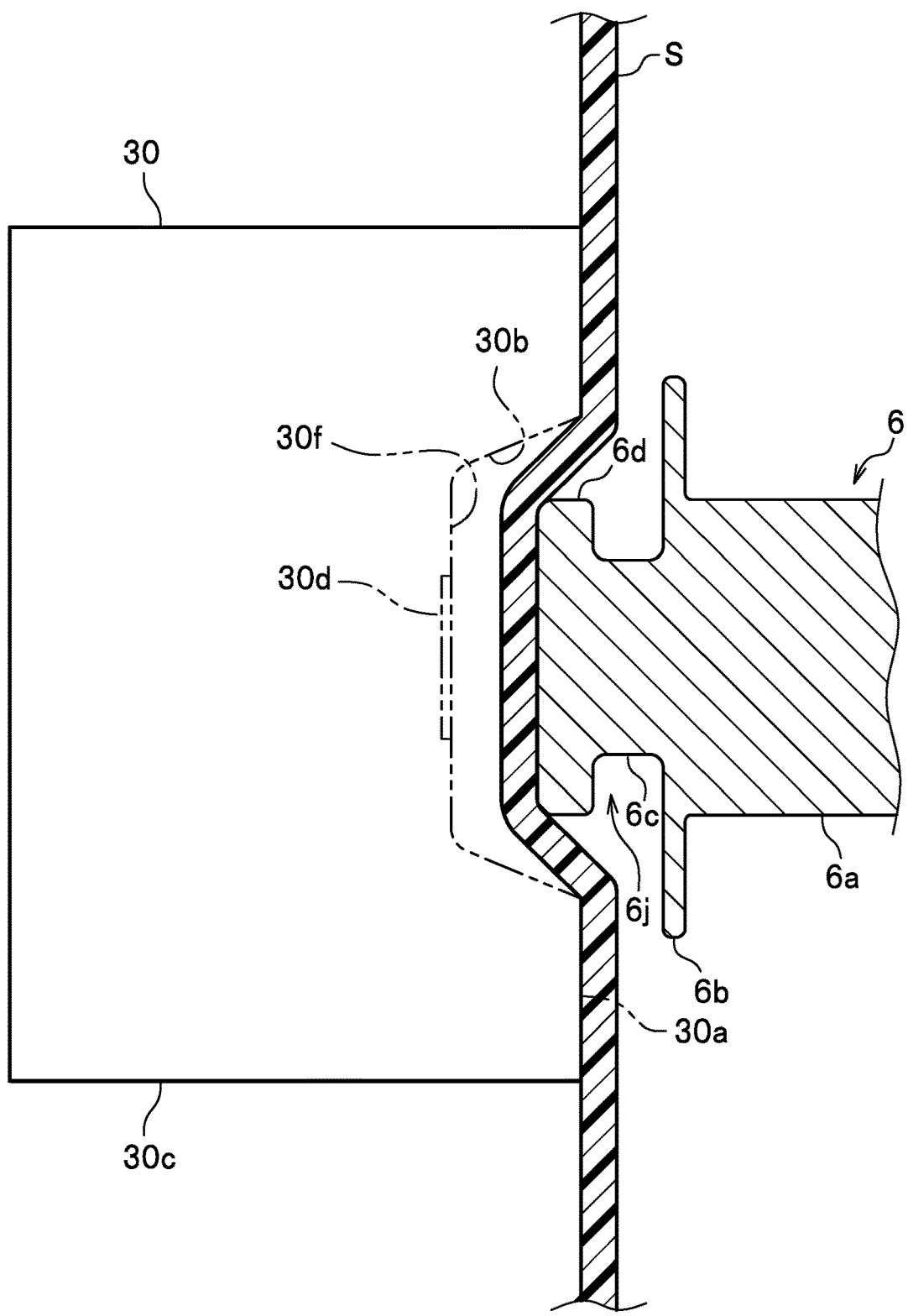
FIG. 5 is a diagram to illustrate transferring a part of a parison around an end in a length direction of a built-in component during molding.

As shown in FIG. 5, the built-in component 6 includes a body portion 6a, a shoulder portion 6b formed at both ends of the body portion 6a, a neck portion 6c formed on an axially outer side of the shoulder portion 6b, and a head portion 6d. The shoulder portion 6b is in a plate shape. The neck portion 6c and head portion 6d are each in a cylindrical shape. Sizes of outer diameters of the neck portion 6c, head portion 6d, and shoulder portion 6b increases in this order. The structure of the built-in component 6 is bilaterally symmetrical in mirror image.

The shoulder portion 6b in FIG. 5 is a portion to cover the recess 30b of the shaping device 30. The shape and size of the shoulder portion 6b are not particularly limited as long as the shoulder portion 6b can wholly cover the recess 30d.

<Transferring Parison around Ends of Built-in Component>

Figure 6:
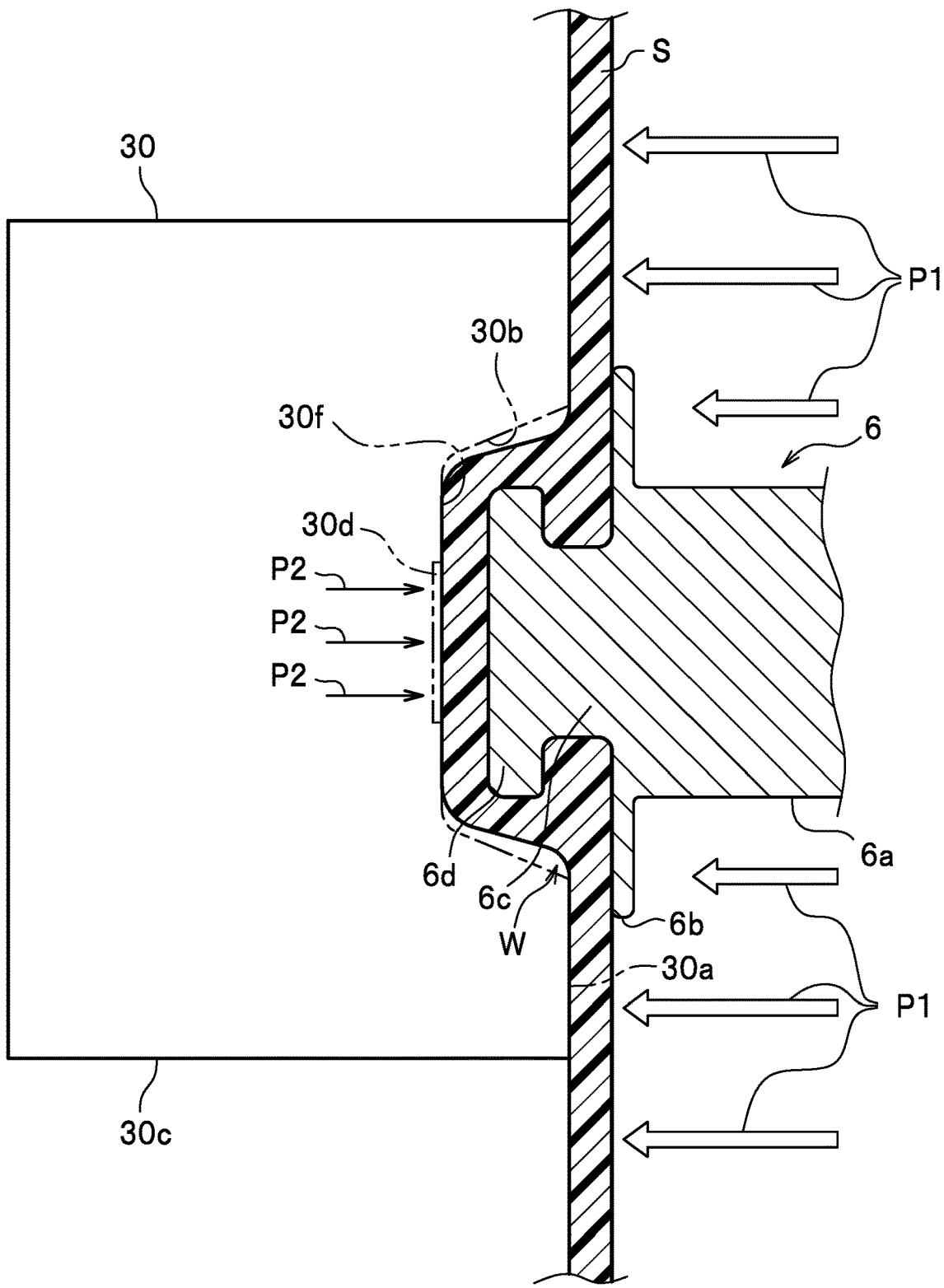
FIG. 6 is still a diagram to illustrate transferring a part of the parison around the end in the length direction of the built-in component during molding.

A description is given of transferring the parison S around the ends of the built-in component 6 during molding, with reference to FIGS. 5 and 6. Note that a description is given here of the first molding die 3, but the same applies to the second molding die 4. In the fuel tank manufacturing process, the shaping device 30 is moved toward the built-in component 6, as shown in FIG. 5, and then clamped so that the neck portion 6c and head portion 6d of the built-in component 6 are pushed into the recess 30b of the shaping device 30, along with a part of the parison S.

As shown in FIG. 6, when the shoulder portion 6b contacts a part of the parison S and covers the opening of the recess 30b of the shaping device 30, and the neck portion 6c and head portion 6d are completely pushed (received) into the recess 30b, air is blown into the first molding die 3 to generate a positive pressure P1 (first positive pressure) in the parison S so that the parison S is transferred to the first molding die 3. In addition, air is blown to the head portion 6d received in the recess 30b, through the air hole 30d formed in the recess 30b, to generate a positive pressure P2 (second positive pressure) in the recess 30b, so that the parison S is made to enter a gap 6j (see FIG. 5) between the shoulder portion 6b and head portion 6d and is then transferred. A part of the parison S entered around the neck portion 6c is referred to as a "wrapping parison portion W)." The wrapping parison portion W is formed around the neck portion 6c.

At this time, the parison S may be pressed between the shoulder portion 6b and the first molding die 3, so that the parison S and the shoulder portion 6b are welded to each other. In addition, the parison S may be pressed to the head portion 6d by the positive pressure P2, so that the parison S and the head portion 6d are welded to each other.

Figure 7:
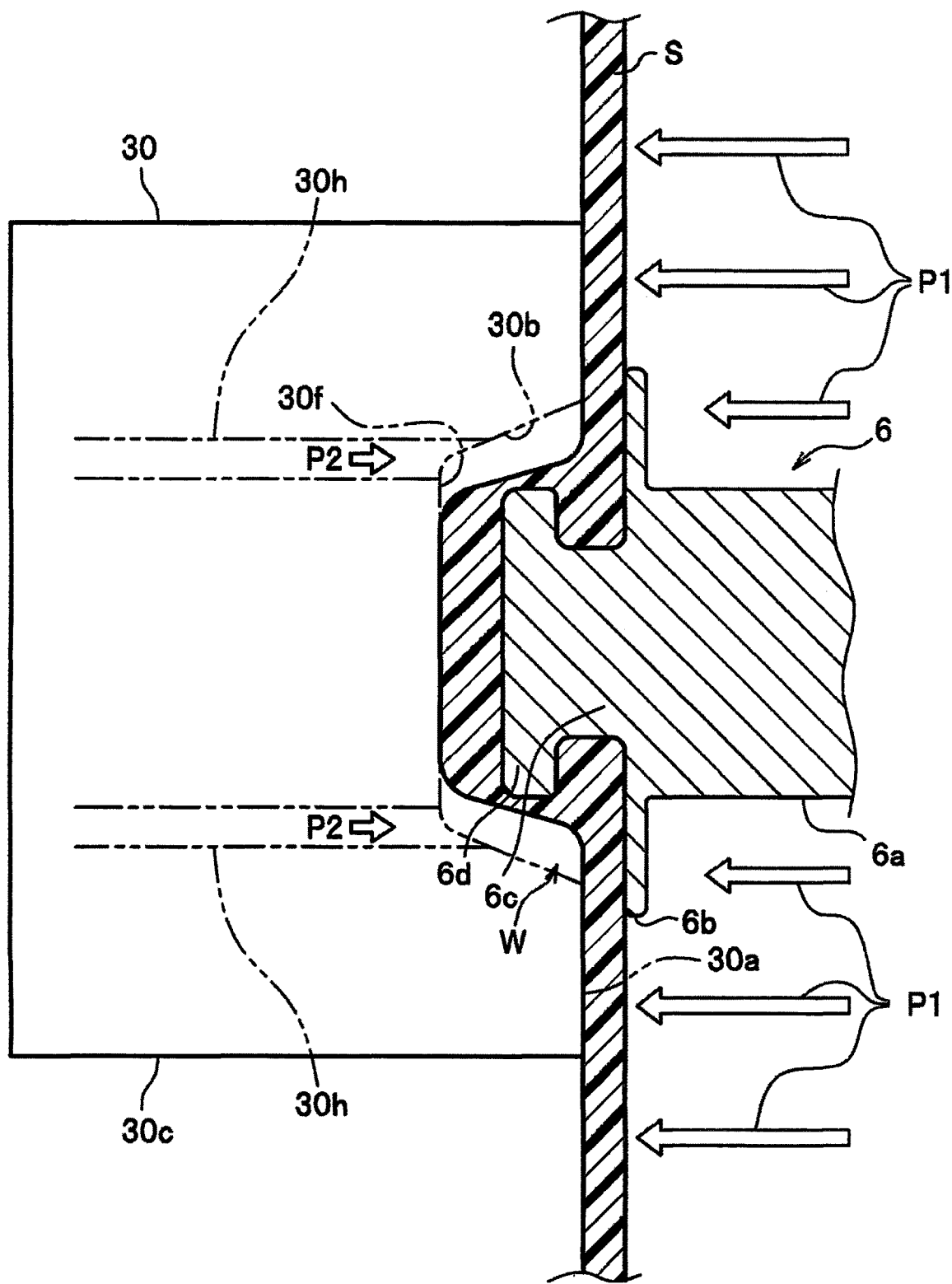
FIG. 7 is a diagram to illustrate transferring a part of a parison around an end in a length direction of a built-in component during conventional molding.

Here, FIG. 7 is a diagram to illustrate transferring a part of a parison around an end in a length direction of a built-in component during conventional molding. As shown in FIG. 7, air holes 30h in a conventional technique have been formed outside an area of the bottom surface 30f of the recess 30b, corresponding to the head portion 6d (radially outer side of the head portion 6d), in order to cause a part of the parison S to enter a narrow space around the head portion 6c. However, shaping the parison S with this conventional technique has a problem that a part of the parison S located radially outside the head portion 6d is fluidized to have a part of the parison radially outside the head portion 6d and around the neck portion 6c locally becomes thinned. Additionally, as no air pressure is applied to the head portion 6d, a part the parison S located on a top surface of the head portion 6d (between the head portion 6d and the bottom surface 30f) becomes thickened, to have variation in thickness of a part of the parison S shaped around the head portion 6d.

In contrast, the shaping device 30 of the present embodiment in FIG. 6 applies air pressure to a part of the parison S on the top surface of the head portion 6d, to prevent said part of the parison S on the top surface of the head portion 6d from becoming thickened. Additionally, applying air pressure to a part of the parison S on the top surface of the head portion 6d allows for keeping said part of the parison S on the top surface of the head portion 6d, to prevent said part of the parison S from becoming thinned. This causes a part of the parison S to be fluidized radially outside the head portion 6d and around the neck portion 6c, with a thickness of the parison S on the top surface of the head portion 6d maintained to a predetermined thickness (desired thickness), to prevent the parison S from being shaped locally thin. This prevents variation in thickness of the parison S.

<Step of Injecting Parison>

Next, a description is given of the whole steps with the fuel tank manufacturing apparatus. The die 2 in FIG. 8A injects the parison S in a cylindrical shape into a space between the first molding die 3 and second molding die 4 which are both opened, as shown in FIG. 8A.

<Step of Putting in Built-In Component>

Next, the elevator 5 is moved up, with the built-in component 6 held, to move the built-in component 6 to a mounting position, as shown in FIG. 8B. Here, the mounting position is located inside the parison S and between the shaping devices 30 and 40.

<Step of provisionally Setting Built-In Component>

Next, the shaping devices 30 and 40 of the first molding die 3 and second molding die 4 are moved in directions to face each other, to hold the built-in component 6 therebetween from both sides, as shown in FIG. 8C. Then, the elevator 5 is moved down, with the built-in component 6 released, and retracts to an initial position. The initial position of the elevator 5 can be any position as long as it does not interfere with the main bodies 3b and 4b of the first molding die 3 and second molding die 4 when they are closed.

<Step of Closing Molding Dies>

Next, the main bodies 3b and 4b of the first molding die 3 and second molding die 4 are moved in the directions to face each other, and the first molding die 3 and second molding die 4 are clamped, as shown in FIG. 9A.

<Step of Blow Molding>

Next, the first positive pressure applying means (not shown) applies the positive pressure P1 (first positive pressure) from inside the parison S in the first molding die 3 and second molding die 4, as shown in FIG. 9B. This causes the parison S to be pressed to the molding portions 3a and 4a of the first molding die 3 and second molding die 4 and transferred. In addition, air (source of the second positive pressure) blown through the air hole 30d applies the positive pressure P2 (second positive pressure) from outside the parison S in the recesses 30b and 40b (see FIG. 6) of the first molding die 3 and second molding die 4. This causes a part of the parison S to be shaped along the neck portion 6c of the built-in component 6 (see FIG. 6). Note that the order of applying the positive pressure P1 and positive pressure P2 is not particularly limited. The positive pressure P2 is preferably set higher than the positive pressure P1.

\<Step of Cooling Parison\>

Next, a cooling means (not shown) is used to circulate cooling air C in the first molding die 3 and second molding die 4, as shown in FIG. 9C. This causes the parison S to be cooled and cured.

\<Step of Opening Molding Dies\>

Next, the first molding die 3 and second molding die 4 are opened and a molded product U is taken out, as shown in FIG. 9D. Then, unnecessary burrs formed at both ends in a length direction of the molded product U are cut off to finish the fuel tank T (see FIG. 1).

According to the present embodiment as described hereinabove, providing the air hole 30d in an area of the bottom surface 30f, corresponding to the head portion 6d, allows for applying air pressure to the head portion 6d. This causes a part of the parison S to be fluidized radially outside the head portion 6d and around the neck portion 6c, with a thickness of the parison Son the top surface of the head portion 6d maintained to a predetermined thickness, to prevent the parison S from being shaped locally thin. Accordingly, this prevents variation in thickness of the parison S and prevents a barrier layer from being broken or damaged. In addition, air applied through the air hole 30d flows along the bottom surface 30f and side surface of the recess 30b, to push the parison S toward the neck portion 6c. This allows for forming the wrapping parison portion W in a circumferential direction with balance. Note that one or more communication holes (not shown) are formed in each of the shoulder portion 6b and the neck portion 6c to flow air around the neck portion 6c toward the tank body Ta while the parison S being shaped. This allows for more reliably shaping a part of the parison S around the neck portion 6c.

In addition, the air hole 30d including two or more openings 30e in a slit shape prevents the parison S from partly entering the air hole 30d while the parison S being shaped. This results in preventing the parison S from being partly shaped into a swell.

Hereinabove, the embodiment of the present invention has been described, but the present invention may be suitably modified within a scope of the present invention. The air hole 30d of the present embodiment includes the two or more openings 30e in a slit shape, but is not limited thereto. The air hole 30d may include two more small holes in a circular shape or polygonal shape, or two or more openings in a circular slit shape along a circumferential direction.

LEGEND FOR REFERENCE NUMERALS

30; 40: forming device, 30a; 40a: end surface, 30b; 40b: recess, 30c; 40c: side surface, 30d; 40d: air hole, 30e: opening, 30f; 40f: bottom surface, 30g: air supply hole, 6: built-in component, S: parison, T: fuel tank, Ta: tank body, 3: first molding ide (molding die), and 4: second molding die (molding die).

The invention claimed is:

1. A fuel tank manufacturing apparatus for a fuel tank, the fuel tank having therein a built-in component with a head portion, a neck portion, and a shoulder portion, and having the built-in component anchored to a tank body with a part of a parison wrapped around the neck portion during molding the tank body, the apparatus comprising:

a pair of molding dies to have the parison transferred to the built-in component by blow molding; and shaping devices respectively provided in the pair of molding dies, wherein the shaping devices each include:

a recess to receive the head portion and the neck portion and covered by the shoulder portion during molding; and an air hole provided in an area of a bottom surface of the recess, facing a portion radially inside of the head portion, and air pressure is applied through the air hole toward the head portion.

2. A fuel tank manufacturing apparatus for a fuel tank, the fuel tank having therein a built-in component with a head portion, a neck portion, and a shoulder portion, and having the built-in component anchored to a tank body with a part of a parison wrapped around the neck portion during molding the tank body, the apparatus comprising:

a pair of molding dies to have the parison transferred to the built-in component by blow molding; and shaping devices respectively provided in the pair of molding dies, wherein the shaping devices each include:

a recess to receive the head portion and the neck portion and covered by the shoulder portion during molding; and an air hole provided in an area of a bottom surface of the recess, corresponding to the head portion, through which air pressure is applied toward the head portion, wherein the air hole is composed of two or more openings in a slit shape.

* * * * *